United States Patent [19]
Schlafly

[11] Patent Number: 5,600,584
[45] Date of Patent: Feb. 4, 1997

[54] INTERACTIVE FORMULA COMPILER AND RANGE ESTIMATOR

[76] Inventor: Roger Schlafly, P.O. Box 1680, Soquel, Calif. 95073

[21] Appl. No.: 945,262

[22] Filed: Sep. 15, 1992

[51] Int. Cl.⁶ ............... G06F 7/38; G06F 3/14; G06F 11/30
[52] U.S. Cl. .......... 364/745; 364/736; 364/736.5; 395/764; 395/183.14
[58] Field of Search ............... 364/736, 736.5, 364/737, 745, 748; 371/29.1

[56] References Cited

U.S. PATENT DOCUMENTS 4,338,675  7/1982  Palmer et al. ............... 364/737
4,398,249  8/1983  Pardo et al. ............... 364/300
4,587,632  5/1986  Ditzel ............... 364/736
5,142,681  8/1992  Driscoll et al. ............... 395/700
5,371,675  12/1994  Greif et al. ............... 364/419.1

OTHER PUBLICATIONS

Programming the 80387 Coprocessor, Byte, Mar. 1988.
"Formulation Translation" of Perfectly Legal in Home Computer Advance Course, Project/Spreadsheet.

*Primary Examiner*—Roy N. Envall, Jr.
*Assistant Examiner*—Emmanuel L. Moise

[57] ABSTRACT

A method for tracking errors in a system of numerical formulas. It uses confidence intervals and special encodings, and is suitable for use in an interactive computer program. Maximum efficiency and accuracy are attained by using directed rounding and compiling into native code.

20 Claims, 9 Drawing Sheets

|   | A   | B       |
|---|-----|---------|
| 1 | 2.1 | +A1+A2  |
| 2 | 3.2 | +A1+B1  |

|   | A   | B   |
|---|-----|-----|
| 1 | 2.1 | 5.3 |
| 2 | 3.2 | 7.4 |

Figure 1

|   | A | B |
|---|---|---|
| 1 | [2.1,2.2] | +A1+A2 |
| 2 | [3.2,3.3] | +A1+B1 |

|   | A | B |
|---|---|---|
| 1 | [2.1,2.2] | [5.3,5.5] |
| 2 | [3.2,3.3] | [7.4,7.7] |

Figure 2

IEEE 754 double precision format (64 bits)

```
x111 1111 1111 1yyy
0000 0000 0000 0000    worksheet
0000 0000 0000 0000    column
0000 0000 0000 0000    row
``` x = sign bit yyy
000   indefinite, string
001   range
010   @na
011   not available
100   @err
101   divide by zero
110   overflow
111   invalid operation

Figure 3

| cell | formula | value |
|------|---------|-------|
| A1 | [database]B1 | 7 |
| A2 | 5-A1 | -2 |
| A3 | @SQRT(A2) | ERR(A3) |
| A4 | @SQRT(A1)*A3 | ERR(A3) |

| cell | formula | value |
|------|---------|-------|
| A1 | [database]B1 | NA(A1) |
| A2 | 5-A1 | NA(A1) |
| A3 | @SQRT(A2) | NA(A1) |
| A4 | @SQRT(A1)*A3 | NA(A1) |

Figure 4

```
; data storage for cells C4, C5, C6
C4        dq    3.1, 3.2          ; 8-byte reals
C5        dq    1.5
C6        dq    0.0, 0.0

; Intel 387 rounding modes
mode_rdown      dw    077Fh
mode_rup        dw    0B7Fh
mode_rnear      dw    037Fh
mode_rchop      dw    0F7Fh ; special nan for ERR tracking
err1            dq    7FF8000000000000r LoadERR:                          ; routine to load a special
ERR
          mov   ah, -1            ; exponent, quiet, ERR bits
          test  al, 1             ; test invalid exception
          jnz   @@1               ; map xxx1 -> 111
          dec   ah                ; so ah = 0F8h + 110b
          test  al, 1000b         ; test overflow exception
          jnz   @@1               ; map 1xx0 -> 110
          dec   ah                ; map 01x0 -> 101
@@1:      mov   byte ptr err1[6], ah
          mov   dword ptr err1, edx
          fld   err1              ; load the ERR
          fclex                   ; clear exception status bits
          ret                     ; return to caller ; calculate C6 := C4 + C5
; where C4 interval, C5 real => C6 interval
calcC6:
          fld   C5                ; load value of cell C5 to stack
          fld   C4                ; load lower value of cell C4
          fldcw mode_rdown        ; change rounding mode to DOWN
          fadd  st(0), st(1)      ; add
          fstp  C6                ; store lower C6 result
          fld   C4[8]             ; load upper value of cell C4
          fldcw mode_rup          ; change rounding mode to UP
          faddp st(1), st(0)      ; add
result:   fstp  C6[8]             ; store upper C6 result
          fstsw ax                ; check status word
          and   al, 1101b         ; overflow, div 0, invalid bits
          jnz   excep             ; jump if exception detected
          fldcw mode_rnear        ; change rounding mode to NEAR
          ret                     ; return to caller
excep:    mov   edx, 00020005h    ; C6 cell address, 4 bytes
          call  LoadERR           ; load special nan
          jmp   result            ; re-store C6 with nan
```

Figure 5

```
; pop real from top of stack
; return ax: normal=0, NA=1, ERR>1
classify:
        enter   8, 0                    ; allocate stack frame
        fstp    qword ptr [bp-8]        ; store to temporary, 8-byte real
        fstsw   ax                      ; get status bits
        and     al, 1101b               ; get overflow, div 0, invalid bits
        mov     ah, al                  ; move to upper byte of ax
        mov     dx, [bp-8][6]           ; get top word from temporary
        not     dx                      ; flip the bits
        test    dx, 7FF0h               ; test for nan exponent
        jnz     @@1                     ; if not, status bits ok
        mov     al, 111b
        sub     al, dl                  ; pick bits identifying ERR/NA
@@1:    shr     ax, 1                   ; throw away unused bit
        fclex                           ; clear exceptions
        leave                           ; discard stack frame
        ret                             ; return to caller ; calculate D1=A1+A2+@IF(@ISERR(B1*B2),C1,C2+C3)
calcD1:
        fld     A1                      ; load cell A1 value
        fadd    A2                      ; add cell A2 value
        fstsw   ax                      ; store flags, possible exception
        push    ax                      ; and save it for later
        fclex                           ; clear exceptions
        fld     B1                      ; load cell B1 value
        fmul    B2                      ; multiply cell B2 value
        call    classify                ; classify into normal=0, NA=1, ERR>1
        cmp     ax, 1                   ; test for ERR
        jg      yes                     ; jump if ERR
        fld     C2                      ; load cell C2 value
        fadd    C3                      ; add cell C3 value
        jmp     after_if
yes:    fld     C1                      ; load cell C1 value
after_if:
        fadd                            ; add (A1+A2) + (C1 or C2+C3)
        fstp    D1                      ; store D1 result
        pop     dx                      ; retrieve prior flags
        fstsw   ax                      ; check status word
        or      ax, dx                  ; combine possible exception bits
        and     al, 1101b               ; test overflow, div 0, invalid bits
        jnz     excep                   ; jump if exception detected
        ret                             ; return to caller
excep:
        mov     edx, 00030000h          ; D1 cell address, 4 bytes
        call    LoadERR                 ; load special nan
        fstp    D1                      ; store D1 result
        ret                             ; return to caller
```

Figure 6

INTERACTIVE FORMULA COMPILER AND RANGE ESTIMATOR

References

1. IEEE Standard 754 for Binary Floating Point Arithmetic.
2. 80387 Programmer's Reference Manual, Intel Corp., 1987.
3. Lotus 1-2-3.
4. Pardo et al, U.S. Pat. No. 4,398,249.
5. U.S. Pat. No. 4,338,675, Palmer et al, Numeric Data Processor.

BACKGROUND OF THE INVENTION

This invention relates to interactive computer programs for doing quantitative analysis. It provides methods for the computation and interpretation of the numeric ranges of formula outputs.

Spreadsheet programs (such as Lotus 1-2-3) running on personal computers have become extremely popular for interactive numerical computations. They offer very convenient data entry and editing, and have many features for the interactive analysis of numerical data. It can display a matrix of cells. Each cell has a value based on some formula stored in the worksheet. The formula may just be a constant value, a sum of numbers in a specified column, or a more complicated mathematical expression depending on other cell values. A simple worksheet is shown in FIG. 1. The upper matrix shows the formulas and the lower matrix shows the values.

Much of the popularity of spreadsheet programs is based on their interactive nature. Any cell can be edited any time and the program automatically recalculates the dependent formulas and updates the cells values. Spreadsheets are very useful for what-if financial analysis. An analyst may wish to see the consequences of changes in data values. For example, he might wish to see how much sooner a loan will be paid off if he increases his monthly payment. Or he may wish to see how his income taxes may change if he makes various charitable contributions. In each case he can try several numbers and immediately see the effects.

A difficulty with spreadsheet programs is that they store numbers in a fixed precision, and have roundoff error in computations. For example, $1/3 = 0.3333...$ is a repeated decimal but only sixteen or so digits can be reasonably stored. If only four digits are stored and that is then multiplied by 3, the result is 0.9999 rather than 1.0000 for a roundoff error of 0.0001. Complicating matters further is that spreadsheet ordinarily use a binary representation internally but display numbers in decimal form, so there are additional roundoff errors in the binary/decimal conversions. These are even harder for the user to understand because he is used to thinking only in decimal. For example, $10*0.1$ may not be exactly 1.0, because 0.1 is stored inexactly in binary.

These roundoff errors may seem relatively small, and they are, but a subsequent computation can increase its significance. For example, if cell A1 has the value 0.1 then the formula $1/(1-10*A1)$ could have a positive, negative, or infinite value depending on rounding subtleties. There is a total loss of significance.

Even if the user understood all these roundoff issues, it would still be difficult for him to predict the effect of roundoff errors. The chain of formulas linking the input to the output may not be apparent and is derived internally by the spreadsheet. The spreadsheet internally finds an ordering of the formulas, called natural order, which is based on the dependencies inherent in the formulas and not on their layout. (Pardo describes one way of finding a natural order in U.S. Pat. No. 4,398,249.)

Thus, when a spreadsheet user looks a numerical result computed by a spreadsheet, he has no idea how many of the digits are correct.

There are other types of numerical errors that occur in spreadsheets. There are arithmetic overflows, such as $10^{10000}$, where the result would be outside the range of representable numbers. There are also mathematically undefined expressions, such as 0/0. Various other errors include function domain errors, such as the square root of −1, and references to cells which are undefined or unavailable.

In the prior art, numeric spreadsheet errors are usually lumped into two categories, labelled ERR and NA. NA is used for cells which are not available for some reason, and for formulas which depend on those cells. ERR is used for all the overflow and domain errors.

Another type of numeric error is the user error. The input numbers may be based on measurement or some other imperfect process, and hence susceptible to error. Such errors may be large or small, and it would seem that spreadsheets would be unable to handle them.

Thus spreadsheet computations have many sources of errors. These may be categorized as measurement, representational, computational, and domain errors.

Another drawback to spreadsheets is that doing a what-if analysis can be rather tedious. Often the user wants to know what the range of outputs will be if inputs are allowed to vary in a particular range. This is usually a trial-and-error process.

Although spreadsheets have no good way of dealing with roundoff error and indeterminate inputs, there are methods in the prior art which have been used in other contexts. One method is the use of probability distributions. This method uses a model where numbers are replaced by a probability distribution on the real line.

A variant of the probability model is the Monte Carlo model. The computations of probability distributions are too complicated, so they are simulated using random numbers. A drawback is that the simulation requires many repeated calculations. Using a small number of repetitions, like 3, means that bad luck can give a vary misleading answer. A large number, like 30, requires an unacceptable slowdown in recalculation time.

Another method is to use binary coded decimal (bcd) arithmetic. Cells values are stored as decimal numbers, so 0.1 is exact. This method eliminates rounding errors when adding up pennies, but does not address other kinds of errors.

Another method is the interval arithmetic model. Each number is replaced with an interval, with the end points being lower and upper bounds for the set of possible values. An operation on an interval has to give an interval large enough to include all real numbers obtained by applying that operation to numbers in each operand interval. For example, let [a,b] denote the set of real numbers in the range from a to b, inclusive. Then $$[-1,2]*[1,3]=[-3,6]$$

because if x is between −1 and 2, and y is between 1 and 3, then $x*y$ must be between −3 and 6.

Implementing interval arithmetic in the presence of roundoff error is tricky. For example, addition may be defined as $$[a,b]+[c,d]=[a+c, b+d]$$

This is correct as long as a+c and b+d are calculated exactly. But if there is roundoff error, as there usually is, then a+c must be rounded down and b+d rounded up in order for [a+c,b+d] to be strictly correct.

These models, as well as others, have been known for many years, but are not widely used. They are not supported by any popular high level programming languages or microprocessors, are technically difficult to implement, and they are much slower than ordinary floating point arithmetic. Furthermore, they involve mathematical subtleties that are difficult to explain.

There is prior art on directed rounding. The IEEE 754 standard for binary arithmetic specifies that processors be able to round up or round down, as well as the more usual round-to-nearest. There are many floating point chips which implement this standard. The standard also specifies binary floating point data formats including infinities and nans. (Nan is a shorthand for not-a-number.) Certain operations which cause overflows or other potentially misleading result generate exceptions, which may be masked or unmasked. An unmasked exception interrupts the processor immediately for special action. A masked exception merely sets a flag which can be queried later and produces an infinity or nan.

In the prior art, spreadsheet formulas are ordinarily translated into a polish form, also called p-code. P-code has the advantages that an interpreter can evaluate it efficiently without parsing, and that the original formula is easily reconstructed from the p-code. While it may seem more efficient to compile into the native code of the processor, it is not at all obvious how to achieve significant performance gains. How to compile formulas within programming languages is well-known to the experts, but spreadsheets are quite different because of their interactive nature, untyped cells, nonsequential execution, unscoped variables, dynamic memory management, multiple data types, and error propagation. Furthermore, it is not at all obvious how to make compiled formulas efficient with the sophisticated error handling of this invention.

SUMMARY AND OBJECTS OF THE INVENTION

It is a primary object of this invention to provide a method for systematically and efficiently handling numerical errors in an interactive spreadsheet-type computer program.

It is also an object of this invention to have a formula range estimator system which provides strict rigorous bounds for numeric outputs.

It is a further object of this invention to have a method of formula calculation suitable for spreadsheet implementation which analyzes accuracy, tracks errors, does best/worst case what-if analysis, and gives results which are easily and unambiguously interpreted by unsophisticated users.

It is another object of this invention to have a method for compiling spreadsheet formulas into native code which is significantly more efficient than p-code.

It is another object of this invention to make reliable numerical computing efficient on commonly available personal computer hardware.

BRIEF DESCRIPTION OF THE FIGURES

FIG. 1 shows a typical worksheet, as found in a spreadsheet program.

FIG. 2 shows a worksheet with interval values and computations.

FIG. 3 shows the system of using nan bits for error tracking.

FIG. 4 illustrates tracking of ERR and NA sources.

FIG. 5 shows an example of a compiled formula with an interval data type for the Intel 387.

FIG. 6 shows a compiled formula requiring especially tricky error detection.

DESCRIPTION OF THE INVENTION

Figure 7:
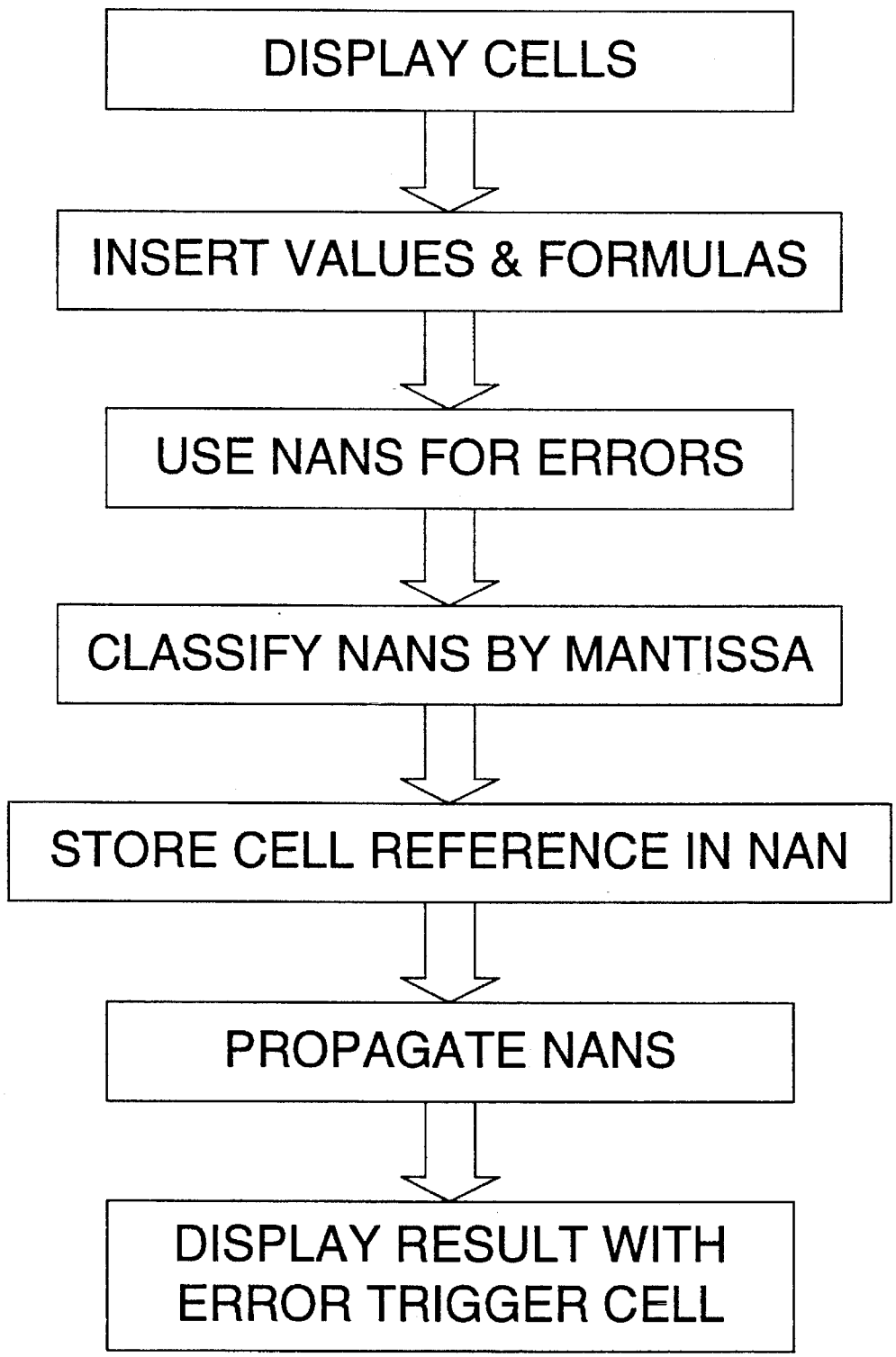
FIG. 7 shows a flow chart for tracking an error.

This invention provides for efficient and reliable real number computations in a spreadsheet context by using an interval data type. Ordinarily a spreadsheet cell value might be one of several data types, usually a text string, integer, or floating point number. The additional interval type consists of two floating point numbers, the first not greater than the second. The two numbers are interpreted as the lower and upper bounds for the real numbers allowed in that cell.

Any function which is defined for a real operand and has a real result is extended to be defined when that operand is an interval. The idea is that the function value with an input interval [a,b] is an interval large enough to include the function value for each x in [a,b].

An interval may be entered directly by the user to reflect a measurement error or other uncertainty. Interval arithmetic is used to evaluate the formulas, and the resultant intervals reflect not only the original uncertainty, but also the roundoff error and other limitations of the computational process.

Substantial speedups can be accomplished by compiling the formulas into native code. Native code for a microprocessor with a floating point unit can be executed much faster than p-code. However, apparent difficulties with native code have made its use impractical prior to this invention.

Evaluation of a particular formula typically involves the following steps.

1. Cell address resolution. A reference to a cell may be relative to another worksheet, or to another cell. A calculation must determine the actual cell.
2. Accessing cell values. Cells can have different types, so a cell value will have an indicator of its type, as well as the actual value.
3. Coercing types. Most spreadsheet functions require arguments to of particular type. If a function expects an 8-type floating point number and the cell value is a string or an integer or an error type, then it must either be converted or processed as an error.
4. Function evaluation. A typical spreadsheet program might have 150 functions which can appear in formulas.
5. Error checking. If an error occurred, whether from an operand, conversion, or function result, the result must be flagged as a error appropriately.
6. Storage. The result must be stored with the cell, possibly requiring an allocation of memory.

Consider a simple spreadsheet formula, such as A1+A2. One might naively think that it could be implemented as a simple addition instruction. But there are several other steps.

First, it must find the memory location where cell data is located, which may require resolving a relative address. Second, it must check the cell types, and check for errors. Third, it must convert the values to floating point numbers in the working data type. Fourth, it must do the addition. Fifth, it must check for errors again, testing for overflow. Sixth, it must store the result in the appropriate cell structure.

To make compiling formulas efficient, it is necessary to eliminate a lot of this overhead, and make each step more efficient. This invention provides such a method.

This invention has a formula compiler, which translates a p-code formula to native code. In order to access cell values efficiently, it assumes that its address in memory and its data type will not change.

In order to track errors (such as ERR and NA) in cell values efficiently, this invention represents those values with nans in the same memory locations floating point values would occupy. Both ERR and NA are represented as nans, with ERR having a larger mantissa than NA. That way, ERR will be treated as an error of higher priority than NA.

Furthermore, the less significant bits of the mantissa are used to hold additional information about the cause of the error. The information consists of a course classification of errors, followed by a pointer to the cell or formula which caused the error. The mantissa gets propagated in computations, allowing the spreadsheet to track errors according to type and cause.

For the interval data type, it is interpreted as an error (ie, ERR or NA) if either part, or both, is a nan.

The native code generation of this invention offers a speed advantage on ordinary floating point formula evaluation, but is especially useful with interval formula evaluation.

DESCRIPTION OF THE PREFERRED EMBODIMENT

Interval arithmetic

Figure 9:
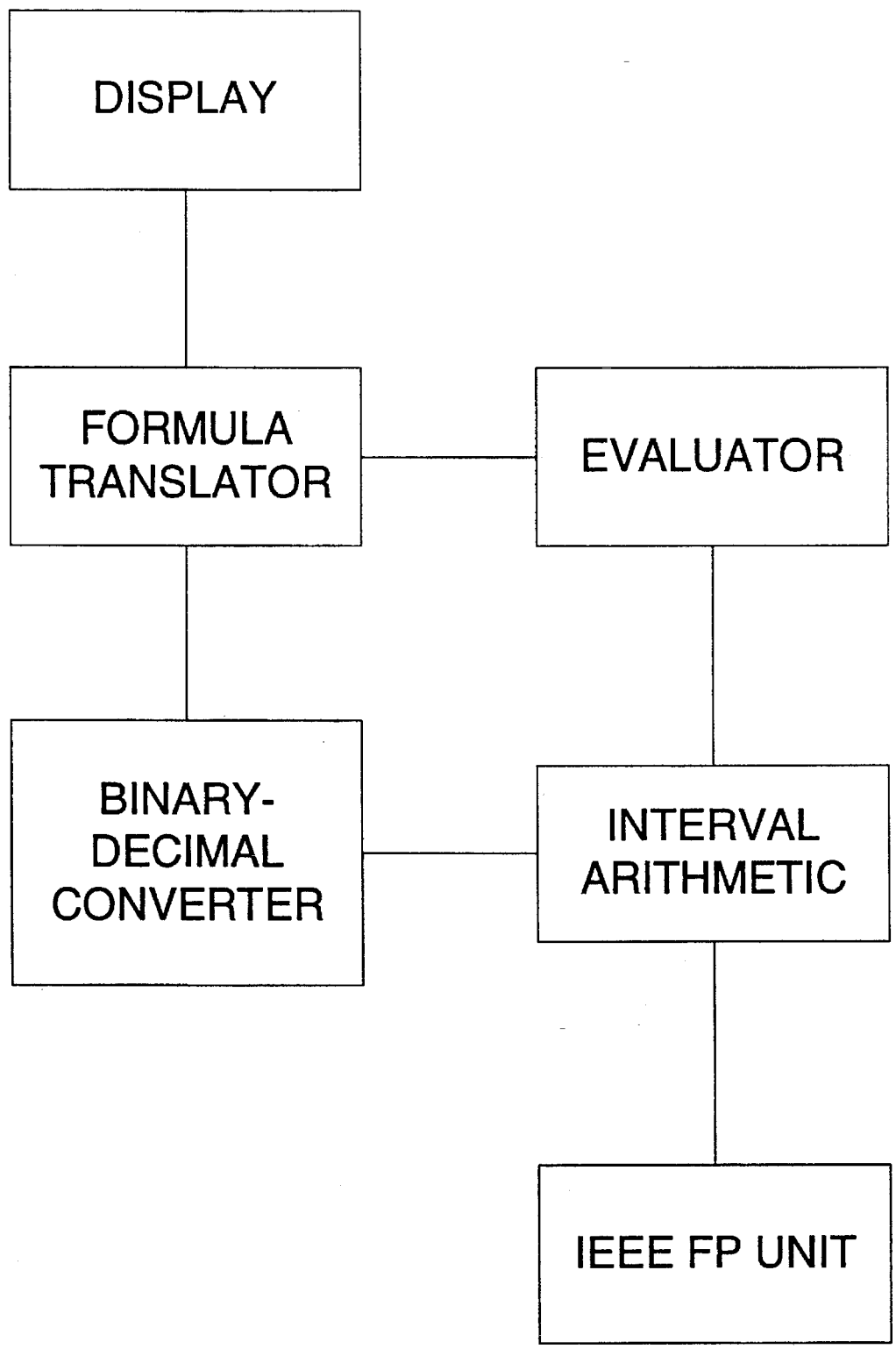
FIG. 9 shows a block diagram for the formula range estimator.

FIG. 9 shows a block diagram for the formula range estimator. Numbers and formulas shown in the display are translated by the formula translator into a form suitable for the evaluator. In the process, the formula translator calls the binary-decimal converter to translate any decimal numbers to binary. The evaluator uses interval arithmetic routines, which in turn use an IEEE floating point unit. The binary-decimal converter also uses interval arithmetic.

Operations on intervals are according to the rules of interval arithmetic. These may be summarized as follows. Operations may mix integers, floating point numbers, and intervals. If necessary, an integer can be converted to a floating point number in the obvious way, and the floating point number x can be converted to the interval [x,x].

Arithmetic. One can add, subtract, multiply, or divide intervals. In each case, the resulting interval is the smallest interval containing all mathematical possibilities. Division reports an error if the divisor interval contains zero.

Binary/decimal conversion. These conversion algorithms use multiplication by powers of 10 and addition. Hence the above interval arithmetic rules apply.

Transcendental functions. Functions like exp(x) are tricky because it is hard to be certain about the last bit. Fortunately, it doesn't matter as much. A practical method is to let exp([a,b])=[exp(a),exp(b)], but with exp(a) calculated to extra precision and rounded down, and exp(b) calculated to extra precision and rounded up. Using extended precision floating point numbers as temporaries is especially useful.

Other functions. Spreadsheets have a number of other numerical functions, such as date and time functions, statistical functions, and financial functions. Most of these can be calculated for intervals by a straightforward application of the aforementioned ideas. One worth mentioning is @vlookup. It does a table lookup to simulate a piecewise constant function. For example, for some real argument x, it might return 52 for 5 <=x <10, 32 for 10<=x<15, and 42 for x>=15. If the input x is an interval [13,16] then the output is the interval [32,42] since it must include all possible outcomes for x.

A few additional functions are added for special handling of intervals. The function @LOWERBOUND(x) returns the lower bound of an interval x, and the function @UPPERBOUND (x) returns the upper bound.

Figure 1:
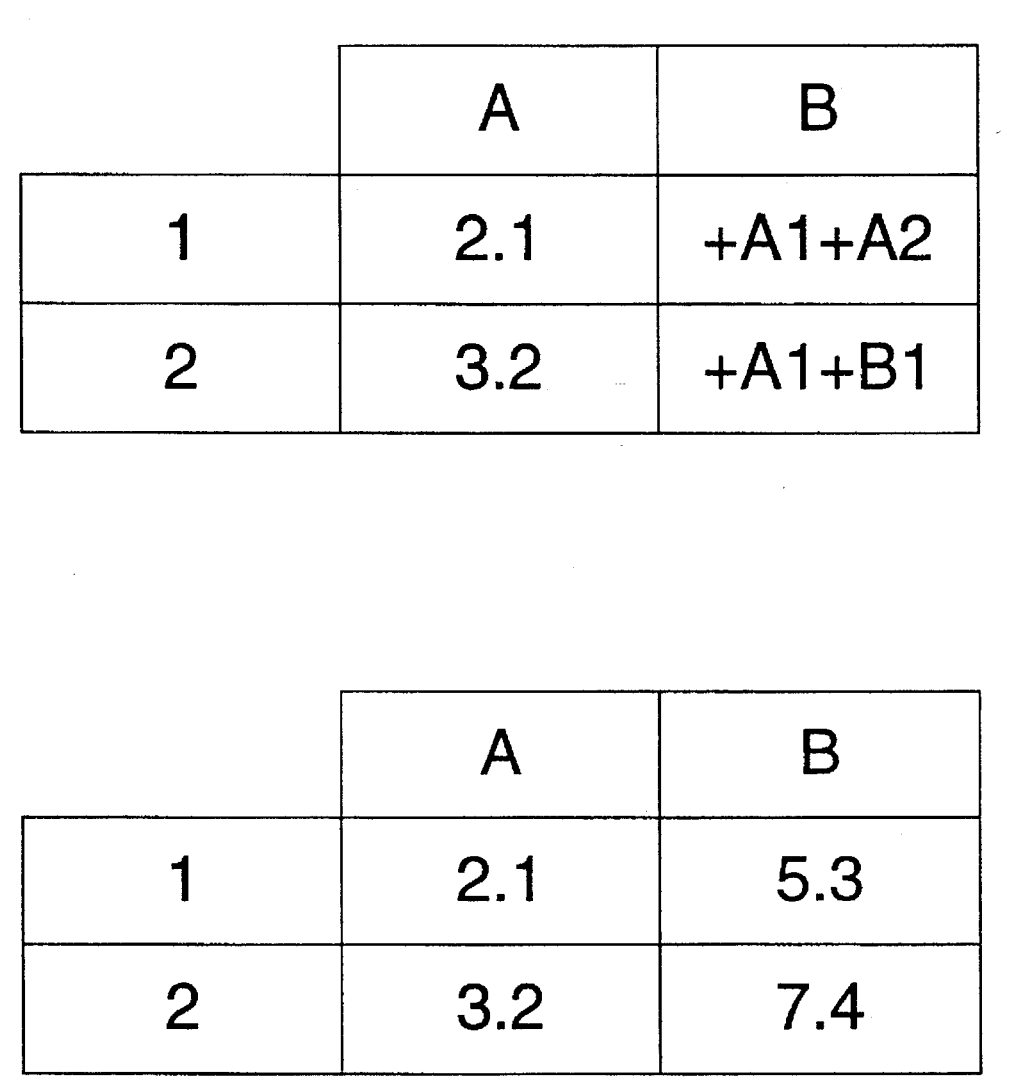

An example of a simple worksheet with intervals is shown in FIG. 2. The upper matrix shows the formulas. It is similar to FIG. 1, but the input data in cells A1 and A2 are intervals. The interval [2.1,2.2] in cell A1 is interpreted as implying that A1 should have some value in that range, but the exact value is unknown. The lower matrix of the figure shows the values, which are intervals computed from the intervals in A1 and A2. The interval value [7.4,7.7] in cell B2 is interpreted as saying that for any values of A1 and A2 in their given ranges, computation of B1 and B2 by their given formulas will result in a value of B2 between 7.4 and 7.7.

There is some extra overhead in using intervals. They require about 8 extra bytes per cell, and computation takes 3 to 4 times as long. However the apparent slowness is compensated by other speedups in this invention, thereby making it competitive with the prior art.

In the preferred embodiment, both parts of an interval are finite real numbers, or nans. Another embodiment might use infinities (positive or negative) as endpoints.

Pythagorean Sums and Products

One drawback of the interval arithmetic of this invention is that it sometimes seems to exaggerate the interval widths. One reason for this is that it is based on a worst-case analysis. If one thinks of the intervals as error bounds, the analysis assumes the errors are correlated, and conspire to make the final error as large as possible.

Often the user doesn't really want such a worst-case analysis, but rather a model which assumes the errors are uncorrelated. Such a model is given by pythagorean sums and products.

Here is how a pythagorean sum works. A sum of two intervals is given by $$[a,b]+[c,d]=[x-y,x+y]$$

where $$x=[a+b+c+d]/2$$

$$y=sqrt((b-a)^2+(d-c)^2)/2$$

The rounding is to nearest. Subtraction is similar. Just subtract [c,d] by adding [−d,−c].

This formula has a natural probabilistic interpretation. If the operands are thought of as 95% confidence intervals for probability variables, then the pythagorean sum is a 95% confidence interval for the sum of the probability variables, under mild assumptions. The assumptions are that the variables are independent (uncorrelated) and that the confidence intervals are based on variance.

An advantage of this method for addition is that it is nearly associative. When summing a set of cell values it won't matter very much what order it is performed. (It wouldn't matter at all in exact arithmetic; in the presence of roundoff error there is an effect but it is usually slight.) Other probabilistic models do not have this property.

Another advantage of pythagorean sums is that the same formulas work for any confidence level. The user can interpret the confidence level as being 80%, 99%, or anything else less than 100%, as long as he is consistent. (Interval arithmetic as described above delivers 100% confidence.)

Pythagorean products are similar, and are given by the formula $[a,b]*[c,d]=[x-y,x+y]$ where $x=(a+b)(c+d)/4$ $y=sqrt(((b-a)(c+d))^2+((a+b)(d-c))^2)/4$ Division is similar. Just divide by [c,d] by multiplying by 1/[c, d], with the latter calculated by the rules of interval arithmetic.

Thus, the preferred embodiment gives the user an option to use pythagorean sums and/or products. Other (nonlinear) operations are performed according to the rules of interval arithmetic. Then the user can choose either a worst-case or a probabilistic analysis. Another embodiment might just offer one model or the other.

Precise Binary/decimal Conversions

Converting decimal numbers to and from binary numbers is usually not exact, so they must be done with care. A user may enter 1.23 but 1.23 is not exactly representable in binary. So this invention converts it in into an interval, using the smallest one containing 1.23. More generally, if the user enters a decimal interval, such as [1.23,1.45] then it is converted to the smallest binary interval containing both endpoints. This is accomplished by applying the usual methods for decimal/binary conversions, but with particular attention paid to rounding. For example, when converting [1.23,1.45], 1.23 is converted to binary with any rounding being down, and 1.45 is converted with the rounding up. A single decimal number 1.23 is converted by converting the interval [1.23,1.23].

To achieve full accuracy with the simplest binary/decimal algorithms on numbers with less than 20 significant digits, the preferred embodiment uses extended precision floating point numbers as temporaries. They are converted to double precision with a final directed rounding.

Conversion of a binary interval to decimal is primarily for display purposes, and the user usually has several display options. One (not very informative) option is to average the endpoints of the interval and to convert and display that average according to any of the usual options in a spreadsheet program. Such options involve the number of digits, fixed or floating point, whether trailing zeros after the decimal point are to be shown, etc.

The preferred embodiment has numeric display format options for showing the interval in a reasonable manner. One option is to show the lower and upper bounds as adjacent reals, using whatever format might otherwise be used for reals. Another is to show the average of the bounds, with or without an error indicator. The error indicator may be in absolute or relative terms. Thus, possible representations of the same interval [2.73,2.74] are:

[2.73,2.74]

2.73|2.74

2.735

2.735±0.005

2.735±0.2%

Further options can specify just how many digits are shown. Another option is to only show those digits where the bounds agree. In this case, the interval would be displayed as 2.7.

The latter option is more subtle than it appears at first glance. Consider the interval [2.234999,2.235001]. The bounds agree to 1, 2, 4, 5, and 6 digits, but not to 3 or 7 digits. Since 6 digit agreement is the best we can do, the interval is displayed as 2.23500.

If the user specifies a fixed number of digits along with the requirement that all shown digits be certain, then unknown digits may be shown with a question mark. For example, the interval [2310,2320] will be displayed as $23.??.?? in a currency format.

The invention also allows the user to conveniently enter intervals. The entry formats parallel the display formats, as described above. One case which requires comment is the one where only certain digits are shown. Consider the user who enters 1.23. He may mean $1.23, in which case 1.23 is to be converted as exactly as possible, or he may mean the subsequent digits are uncertain, in which case the number may be anything from 1.225 to 1.235. In the latter case, the invention specifies that the user enter 1.237, and then it is converted to the largest binary interval that can be displayed as 1.23. That interval may be obtained by converting 1.225, rounded up, and 1.235, rounded down.

Alternate embodiments may use different notations for uncertain digits, or represent them with slightly different intervals, such as [1.22,1.24] or [1.22501,1.123499] instead of [1.1225,1.1235].

Error propagation

FIG. 7 shows a flow chart for tracking an error. The first step is to display cells with numerical values. Then a user interactively inserts values and formulas. Then errors resulting from evaluation of those formulas are represented by nans. Then those nans are classified by their mantissas. Then a cell reference is stored in the nan. Then further formula evaluations propagate the nans to other cells and formulas. Then the results are displayed, with nan cells showing the error trigger cell.

In the preferred embodiment, IEEE Standard 754 binary floating point numbers are used. Double precision is used for the lower and upper bounds, with extended precision used for intermediate calculations.

Extended precision is especially useful in binary/decimal conversions. That way, roundoff will not cause any unnecessary widening of the result interval.

The cell types are string, 2-byte integer, 8-byte real, 16-byte interval, ERR, or NA. Strings are ordinary ascii character sequences, and are usually converted to zero in arithmetic expressions. The integers range from −32768 to +32767. The 8-byte reals are in IEEE Standard 754 double precision binary floating point format. The interval consists of two reals. ERR is a special code indicating an erroneous or undefined value, such as resulting from division by zero. NA is a special kind of undefined value resulting from not available data.

(It should be noted that while ERR and NA are loosely called errors, they are not necessarily user mistakes that need to be corrected. The fact that a result cannot be represented as a finite real number may be a useful outcome to a calculation.)

In the prior art, ERR and NA are usually represented as IEEE infinities. This has the advantage that they need not be treated as special types, but rather as particular reals. However, they still must be treated as special cases because the IEEE rules for arithmetic on infinities differ from those for ERR or NA.

This invention also represents ERR and NA as 8-byte reals, but as IEEE nans. The mantissa of ERR is numerically larger than that of NA. Then, according to the rules of IEEE arithmetic, any computation involving ERR will result in ERR, and any computation involving NA and not ERR will result in NA.

A particular choice for the ERR and NA representations is shown in FIG. 3. These numbers are in binary notation, with the most significant bits on the left. The sign bit may be 0 or 1, it doesn't matter. The next eleven bits form the biased exponent, and the exponent consisting of all ones is the largest possible in the 8-byte format. Numbers with that exponent are either infinities or nans.

The bit after the exponent is also 1, making the nans quiet nans. The quiet nans don't generate exceptions under most operations. Quiet nans are advantageous because exceptions slow down execution if unmasked, and because masked exceptions on signaling nans will cause the chip to put the quiet bit in anyway. But more importantly, quiet nans are essential to the method of tracking error sources described below.

The next three bits, denoted yyy, indicate the type of nan in use. These determine whether the value is displayed as ERR or NA. The classification is as follows.

000. String. If all the other mantissa bits are zero, it is also the special nan indefinite. Other values represent text strings.

001. Range. A range is a collection of cells, usually a rectangular block. Many spreadsheet functions take range arguments.

010. @NA. There is a special function called @NA which artificially generates NA, and it used to indicate that the cell value is not available yet.

011. Not available. Generated by a cell reference which is genuinely not available, such as one located on a worksheet which is not loaded or on a network which is not currently connected.

100. @ERR. There is a special function called @ERR which artificially generates ERR, and it is typically used in conditional formulas.

101. Zero divide. Indicates division by zero, an IEEE 754 exception.

110. Overflow. Indicates floating point overflow, an IEEE 754 exception.

111. Invalid. Indicates invalid operation, an IEEE 754 exception.

The latter three ERR values may be generated by arithmetic operations according to the IEEE 754 rules, but may also result from function domain or range errors. For example, the logarithm of a negative number would be considered an invalid operation.

The remaining six bytes of the nan are used to identify the cell address of the offending formula. In the preferred embodiment, the address is stored as two bytes for the worksheet number, two bytes for the column number, and two bytes for the row number.

An alternate embodiment might only distinguish between ERR and NA, or use addition bits to distinguish other types of errors.

An alternate embodiment might make certain of these nans into signaling nans for the purpose of catching special errors.

The preferred embodiment uses the other mantissa bits to track errors. The zeros can be changed arbitrarily without changing the ERR/NA propagation logic, since they are numerically less significant. When an operation triggers ERR or NA, the cell address of the appropriate cell is stored in those bits. The cell address will then be propagated accordingly.

The advantage of propagating the cell address is to trace errors. If the user sees NA on his screen, he often wants to know just what cell value was not available. Putting cell addresses in the NA or ERR representation makes that possible.

A display option shows the ERR or NA source on the screen. For example, ERR(B5) means that a formula returned ERR as a result of an error that can be traced to cell B5. (There might be other contributing errors as well.)

For example, see the worksheet shown in FIG. 4. The formula in cell A1 refers to an entry in an external database which happens to have the value 7. In the upper part of the figure, the value is retrieved and placed in cell A1. Cell A2 subtracts it from 5 and gets the value −2. Cell A3 takes the square root, triggering an invalid operation exception, and generating a nan of ERR type and with the A3 cell address stored in the mantissa. The cell A4 requires a computation depending on cell A3. The value in A3 is a quiet nan and no further exception is raised, so the nan value is propagated. Both A3 and A4 have the same nan value, and that value is displayed as ERR showing the root cause as the formula in cell A3.

The lower part of FIG. 4 shows what happens if the database is not available. The cell A1 get a nan of NA type with the A1 cell address, as that is the cell with the faulty formula. The other cell formulas depend on A1, but A1 has a quiet nan and no exceptions are raised as it is propagated. A user who is disappointed to see NA as the value for A4 can readily trace it to cell A1 to see the cause.

Another embodiment may show how the error was formed (eg, divide by zero). If a numeric formula improperly depended on a string, that can also be shown.

Other embodiments may have additional types, or use different sized data types.

Compiling

Figure 8:
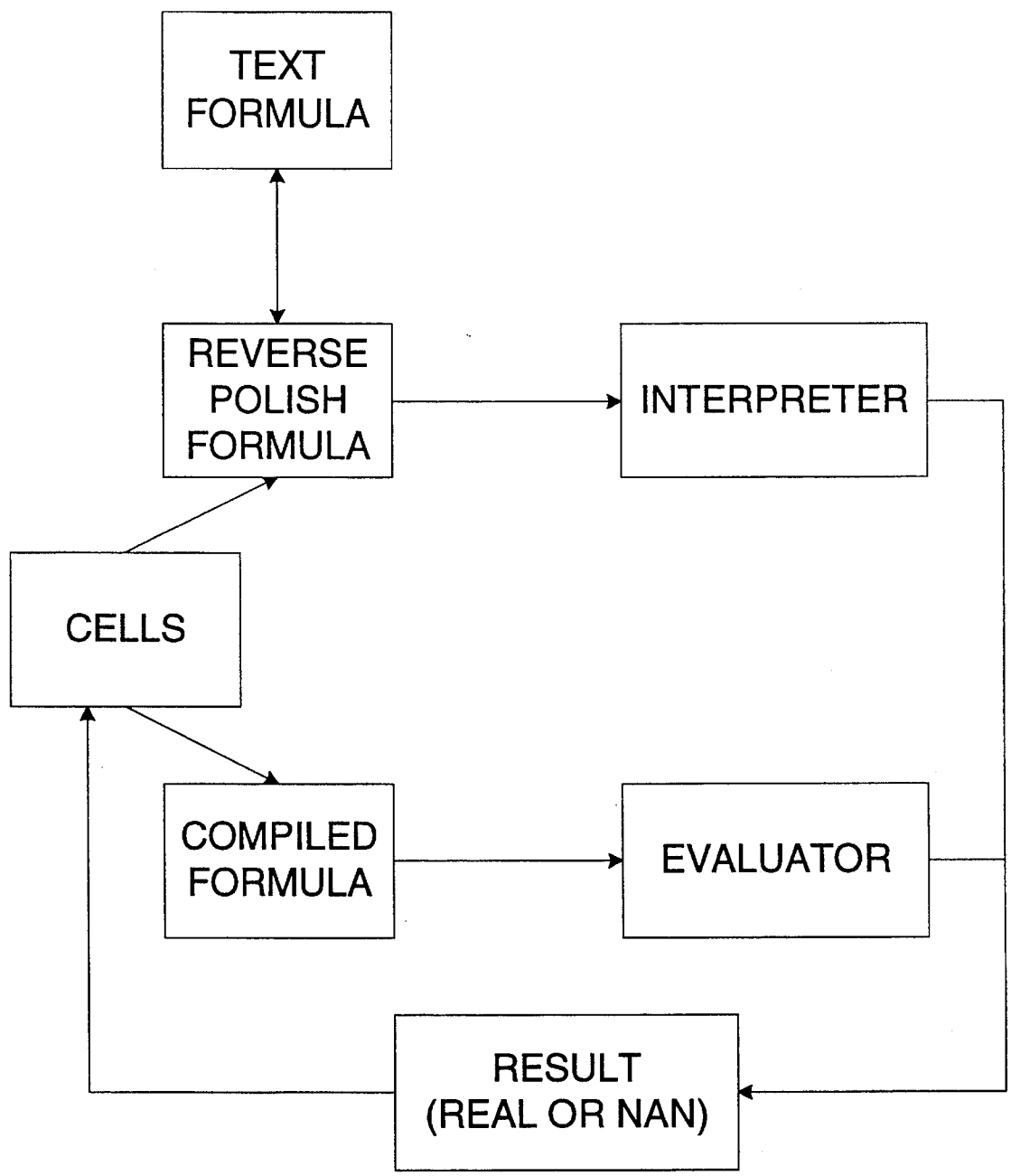
FIG. 8 shows a block diagram for the formula representation system.

FIG. 8 shows a block diagram for the formula representation system. A text formula is convertible to a reverse polish formula, and back. A reverse polish formula references values from cells, and may be fed into the interpreter which evaluates it to give a result (real or nan). The result can then be put back into a cell.

An embodiment of the formula compiler uses the Intel 387 numeric processor chip. It complies with the IEEE Standard 754 for binary floating point arithmetic and is commonly available in microcomputers. Its architecture has eight extended precision floating point registers, a stack oriented instruction set, and modes for rounding control.

Another embodiment might use another processor that might not be stack-oriented, but the examples here refer to the Intel 387 architecture. The Intel 486 and various compatible chips use the same architecture.

FIG. 5 shows an example of a spreadsheet formula, and a listing of code generated for the Intel 387 chip. It shows the compiler generated code to add two cells, one of which is an interval. The result is an interval.

Note the instructions to load the control word. Changing the rounding mode is accomplished by storing the various control words representing different rounding modes in memory, and loading the appropriate one whenever the rounding mode needs to be changed.

The error detection method is designed so that exceptions can be masked. The calculation begins under the assumption that the exception flags of interest (divide by zero, overflow, invalid operation) are clear. At the end of the formula computations, the status word is checked to see if an exception occurred. If so, then the appropriate nan is generated.

To track the source of a new error, the cell address is put into a register before branching to the routine which constructs the nan. The address is a reference to the cell whose formula generated the error. If a (masked) exception was raised in the course of computing the formula, then the new nan is returned.

Note that the formula may still return an ERR or NA nan without raising an exception during its computation. If the formula depends on another cell having an ERR value, the value is propagated without causing an exception. The is because ERR is represented as a quiet nan, and according to the IEEE 754 arithmetic rules, quiet nans do not raise exceptions. (On the Intel 387, this necessitates using the FUCOM instruction rather than FCOM.) This use of quiet nans is crucial because it allows a reference to the source of the original ERR to be propagated.

An apparent fatal flaw in this method of error detection is that it seems impossible to implement the Lotus functions @ISERR and @ISNA. These determine whether the argument is ERR or NA. For example, @ISERR(1/A1) must return true if A1 is zero or ERR, and false otherwise. (It might also be true if A1 is a denormal and 1/A1 overflows.) The difficulty here is that the error detection method will make an entire formula have the value ERR if a divide by zero occurs anywhere during its evaluation, but @ISERR never returns ERR.

This invention employs a special trick to make evaluation of @ISERR and @ISNA possible. It is explained for @ISERR, as @ISNA is similar. The idea is to isolate the expression which is the argument to @ISERR, save and clear the exception status flags before evaluating the expression, testing whether an exception occurred during the evaluation of that expression and whether the result is a nan of the appropriate type, generating the correct result for @ISERR, and restoring the prior exception status flags. Again, it is not necessary to unmask exceptions.

An example of a compiled formula using @ISERR is illustrated in FIG. 6. The formula might return ERR, but only if there is an error outside the argument to @ISERR. If A1+A2 causes an overflow, the overflow bit in the status word will be turned on, and saved for after the @ISERR computation.

In any of these cells, an ERR may be generated by a quiet nan which doesn't generate an exception. Hence testing for ERR requires checking for a nan and looking at the nan bits as well.

Note that it is not necessary to actually copy the prior exception status bits back into the Intel 387 status word. The prior status word can be kept in any convenient place and combined with a later status word with a logical OR operation when the time comes to test whether an exception occurred. If that convenient place is on the stack, as in the figure, then @ISERR functions can be nested arbitrarily.

FIG. 6 also illustrates another subtle feature of this invention which also involves the interaction of the error propagation logic with the formula compilation. The Lotus function @IF(X,Y,Z) returns Y if X is true, and Z otherwise. A straightforward p-code evaluator would evaluate X, Y, and Z, and then select either Y or Z based on the value of X. The trouble with this is that if X is true, then Z is calculated unnecessarily, potentially triggering an exception which incorrectly causes the formula to return ERR. By compiling the formula, it is possible to calculate X first, and then calculate either Y or Z, whichever is needed. The method is more efficient, and returns correct results without altering the error propagation logic.

The Lotus function @CHOOSE is similar to @IF, and this invention optimizes it similarly. It is also possible to optimize the logical #AND#and #OR#, by similarly avoid unnecessary computations in some cases.

Although cell values can be strings, reals, or other types, most functions have fixed argument and result types. So while a p-code interpreter must repeatedly check types and take appropriate action, the compiler checks types at compile time. In most cases, no conversion is necessary. Thus execution is more efficient.

If a conversion is necessary, this invention provides a very efficient way to do it. For example, consider the Lotus formula @DATE(1992,9,A1), which return a date value for the day in September 1992 given by the cell A1. The @DATE function requires an integer, but A1 may have a real value. The conversion is done directly, as illustrated by the following Intel 387 code fragment.

| fld | A1 | ; load A1 value |
| fldcw | mode_rchop | ; change rounding mode to CHOP |
| fistp | word ptr temp | ; convert to 16-bit integer |
| fldcw | mode_rnear | ; change rounding mode to NEAR |
| mov | ax, temp | ; prepare to call date function |
| ... | | |

The use of the chop rounding mode is customary in implicit real/integer conversions, and is most efficiently done inline, as shown. The important point here is that the processor does the conversion directly without worry about whether the conversion is possible. If the value of A1 is a nan or outside the integer range, then the conversion will raise an invalid operation exception, and the result of the formula will eventually be converted into a nan of ERR type.

The @DATE function will also have to check that the arguments are in range. In this case it will return ERR if the day is not in the range from 1 to 30.

Unfortunately, in this example, if the value of A1 is a nan then the mantissa bits will be lost. An NA value will be improperly converted to ERR. To properly propagate the nan, several extra instructions are necessary.

| fld | A1 | ; load A1 value |

```
        fxam                            ; examine to see if it is a nan
        fstsw    ax                     ; check status word
        sahf                            ; move condition code to carry
                                          flag
        jc       result                 ; if a nan, jump
        fldcw    mode_rchop             ; change rounding mode to
                                          CHOP
        fistp    word ptr temp          ; convert to 16-bit integer
        fldcw    mode_rnear             ; change rounding mode
                                          to NEAR
        push     1992
        push     9
        push     temp
        call     date
result:
        ; store result and test for exceptions
        ...
```

The compiler of this invention makes a number of optimization options possible, and an embodiment might place some of these under user control. For example, a user who is not concerned with tracking errors or in distinguishing ERR from NA and who wants the fastest possible recalculations might opt for skipping some of the nan and exception logic. A computation might generate infinities and nans, and these would simply be displayed as ERR values. For example, the extra few instructions in the preceding @DATE function could be skipped. It is an advantage of this invention that the overhead in strictly correct error handling can be selected by the user as needed.

Another option concerns the tradeoff between size and speed. There are some functions that might reasonably be compiled inline for maximum speed, or as a call to a library of functions to save space. Such options are common in compilers.

In a particular embodiment, the compiler may make assumptions about cell types and memory locations for efficient access. If these assumptions become invalid due to some user action or memory reorganization, the compiled formula is marked as invalid. A recalculation is then based on the p-code or on a recompilation.

In the preferred embodiment, the spreadsheet program has a p-code interpreter and keeps the original p-code of the formulas. If for any reason the compiled formula is unavailable or invalid, the interpreter can still evaluate the p-code version of the formula. The p-code interpreter is similar to the prior art, except that it has the improvements of this invention, notably the ability to process intervals and track error efficiently.

An embodiment might provide an option to generate code which accesses cell data correctly in all cases. Whether this causes any extra overhead or loss in efficiency depends on the particular memory organization of the spreadsheet program.

In an alternate embodiment, the compiled code runs with certain exceptions unmasked. A trap handler is invoked whenever the exception occurs. The handler analyzes the cause of the exception, and in most cases simply continues execution just as if the exception had been masked. The advantage to trapping exceptions is that it allows custom error handling for certain cases where different behavior is desired. For example, in most spreadsheets $0^*NA$ is evaluated as NA. This is also the default result using this invention. But someone may prefer that $0^*NA$ evaluate to 0, as zero multiplied by any (finite) real number is zero. A trap handler could recognize this case, and modify the nan accordingly.

With a trap handler, it is also possible to use signaling nans. This invention prefers quiet nans because they allow error source references to be propagated smoothly. But a signaling nan allows a trap handler to give it some special treatment. In routine cases, the trap handler can simulate a masked response to a quiet nan, and thus still propagate its mantissa. A possible application is to use signaling nans for strings, and then have the trap handler convert them into zeros if they occur in an arithmetic context.

The actual register usage of the compiler will depend on the processor architecture. In the case of the Intel 387, its stack structure makes translation straightforward. For example, the formula $A1+A2^*A3$ will be represented in p-code as the sequence of tokens $\{A1\ A2\ A3\ ^*+\}$. The compiler can easily translate the p-code into

```
        fld      A1
        fld      A2
        fld      A3
        fmul
        fadd
```

(Slightly better code sequences are possible, as there are some instructions which combine loading with an arithmetic operation.) One point of note here is that the Intel 387 has a stack of only eight floating point registers. That is enough for most formulas, but it is not hard to find formulas which seem to require more. The preferred solution is for the compiler to keep a table of how many registers each function needs. Then it can calculate the maximum number of registers that a formula seems to need. If no more than eight, there is no problem. Otherwise, it may have to temporarily dump register values to memory while evaluating a subformula that goes over the limit.

An alternate embodiment might install a trap handler to catch stack overflow and underflow exceptions. The Intel 387 has a status bit precisely for this purpose. The trap handler can then simulate a stack with perhaps a hundred registers, and the compiling can generate code without worrying about how deep the stack is.

The description of this invention refers to spreadsheet programs, but the same method applies to other programs, such as an interactive database program. The references to cells and formulas use the Lotus notation, but other notations are also possible.

The invention has been described in its preferred embodiments, but many changes and modifications may become apparent to .those skilled in the art without departing from the spirit of the invention. The scope of the invention should be determined by the appended claims and their legal equivalents.

I claim:

1. A computer-implemented method for estimating the range of a numeric formula in an interactive computer program, comprising representing real numbers as intervals;

breaking the formula into a sequence of primitive operations;

estimating bounds for each primitive operation;

converting decimal numbers precisely;

displaying each interval in a cell; and evaluating said formula as a sequence of interval operations.

2. The method of claim 1 further comprising using the directed rounding operations of an IEEE floating point arithmetic processor to estimate said bounds.

3. The method of claim 1 further comprising optionally using pythagorean operations to estimate said bounds for sums or products.

4. The method of claim 1 further comprising translating formulas into processor commands.

5. The method of claim 1 further comprising optionally displaying only those digits where both interval endpoints agree.

6. A computer-implemented method for the tracking of numerical errors in an interactive computer program, comprising maintaining a collection of formulas in natural order;

using quiet nan mantissa bits to track the source cell of an error, with higher order bits being used to classify the error type;

evaluating said formulas with an IEEE floating point arithmetic processor;

testing for an exception raised at the end of the evaluation of each said formulas;

creating a quiet nan with a cell address encoding if said exception is raised; and displaying said nan with a pointer to the source of the error.

7. The method of claim 6 further comprising using bits from said nan mantissa designating ERR and NA which are more significant than the address bits, so that all ERR values have mantissas numerically greater than those of all NA values.

8. The method of claim 6 further comprising converting infinities to ERR.

9. The method of claim 6 further comprising masking exceptions on said processor.

10. The method of claim 6 further comprising trapping exceptions for special error processing.

11. The method of claim 6 further comprising using signaling nans to represent strings or other nonnumeric data types.

12. A computer-implemented method for the evaluation of a collection of formulas in an interactive computer program, comprising representing said formulas in polish form;

arranging said formulas in a natural order;

translating said formulas into native code with inline floating point instructions;

using infinities and nans for error propagation;

anticipating coercions based on known cell and function return types; and using a function library for the more complicated functions.

13. The method of claim 12 further comprising resolving addresses based on assumptions about memory locations and data types, and invalidating said native code if those assumptions change.

14. The method of claim 12 further comprising processing interval data types.

15. The method of claim 12 further comprising using nan mantissa bits to track the type of an error.

16. The method of claim 12 further comprising using nan mantissa bits to track the source cell of an error.

17. The method of claim 12 further comprising using signaling nans to represent strings or other non-numeric data types.

18. The method of claim 12 further comprising falling back to a p-code interpreter in case said native code is unavailable or invalid.

19. The method of claim 12 further comprising executing said native code on an IEEE floating point processor with exceptions masked;

using status flags on said processor to test for errors at the end of execution of said formulas; and selectively saving the status flags in order to detect errors in a subexpression.

20. The method of claim 12 further comprising trapping exceptions to simulate a deep stack of floating point registers or for special error processing.

* * * * *